(12) United States Patent
Woodward

(10) Patent No.: US 6,511,355 B1
(45) Date of Patent: Jan. 28, 2003

(54) CATALYST EXHAUST SYSTEM

(75) Inventor: Lee A. Woodward, Racine, WI (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/653,294

(22) Filed: Aug. 31, 2000

(51) Int. Cl.[7] .......................... B63H 21/10; F01N 3/00; F01N 7/00
(52) U.S. Cl. ........................ 440/88; 60/298; 60/324
(58) Field of Search ........................ 440/88, 89; 60/292, 60/298, 299, 324

(56) References Cited

U.S. PATENT DOCUMENTS

| | | | | |
|---|---|---|---|---|
| 3,635,031 A | * | 1/1972 | Haddad | 60/307 |
| 3,852,041 A | * | 12/1974 | Moore et al. | 422/176 |
| 4,735,046 A | * | 4/1988 | Iwai | 60/295 |
| 4,772,236 A | | 9/1988 | Takahashi | |
| 4,848,082 A | | 7/1989 | Takahashi et al. | |
| 4,900,282 A | | 2/1990 | Takahashi et al. | |
| 5,100,351 A | | 3/1992 | Shibata | |
| 5,174,112 A | * | 12/1992 | Sougawa et al. | 60/302 |
| 5,203,167 A | * | 4/1993 | Lassanske et al. | 60/298 |
| 5,212,949 A | * | 5/1993 | Shiozawa | 60/298 |
| 5,366,401 A | * | 11/1994 | Nanami et al. | 440/89 |
| 5,408,827 A | * | 4/1995 | Holtermann et al. | 60/298 |
| 5,433,073 A | * | 7/1995 | Duret et al. | 60/288 |
| 5,554,057 A | * | 9/1996 | Abe et al. | 440/89 |
| 5,771,686 A | * | 6/1998 | Pischinger et al. | 60/274 |
| 5,809,776 A | * | 9/1998 | Holtermann et al. | 60/288 |
| 5,845,486 A | * | 12/1998 | Yamashita et al. | 60/274 |
| 5,899,063 A | * | 5/1999 | Leistritz | 60/298 |
| 6,116,022 A | * | 9/2000 | Woodward | 60/300 |

* cited by examiner

Primary Examiner—S. Joseph Morano
Assistant Examiner—Andy Wright
(74) Attorney, Agent, or Firm—Timothy J. Ziolkowski; J. Mark Wilkinson

(57) ABSTRACT

A catalyst exhaust system includes a catalyst housing having an inlet end, an outlet end, and a passage therethough. The outlet end includes a valve seat, and a water jacket surrounds the catalyst housing. A valve housing is in flow communication with the outlet end and in flow communication with said water jacket to accommodate a valve configured to allow passage of exhaust gases but prevent water from entering the catalyst housing passage and reaching a catalyst therein.

26 Claims, 5 Drawing Sheets

CATALYST EXHAUST SYSTEM

BACKGROUND OF THE INVENTION

This invention relates generally to catalyst exhaust systems for internal combustion engines, and more particularly, to a water-cooled catalyst exhaust system for marine propulsion systems.

Exhaust gases from internal combustion engines are typically treated by a catalyst to purify exhaust emissions by chemical reaction as the exhaust gases flow through the catalyst. The catalyst is placed in the exhaust gas flow path from combustion chambers of the engine to ensure treatment of exhaust gases.

The use of a catalyst, however, presents certain problems. For example, not only are exhaust gases typically hot but the catalyst operates at elevated temperatures to achieve desired chemical reactions, thereby producing thermal stresses that tend to shorten a life span of a catalyst housing surrounding the catalyst. In some application, such as in marine engines, a water jacket may be used to cool the catalyst housing, but if water contacts the catalyst, it can damage the catalyst and render it ineffective. Further, because exhaust gases in marine engines are typically mixed with water and discharged into a body of water below the water line through a rearwardly faced opening formed in a hub of a propeller, rapid deceleration or reverse operation of the propeller tends to drive water backward through the exhaust system and cause the catalyst to be splashed, thereby impairing the catalyst.

BRIEF SUMMARY OF THE INVENTION

In an exemplary embodiment, a catalyst exhaust system for a marine engine includes a catalyst housing having an inlet end, an outlet end, and a passage therethough. The outlet end includes a valve seat, and a water jacket surrounds the catalyst housing. A valve housing is in flow communication with the outlet end and in flow communication with said water jacket to accommodate a valve configured to allow passage of exhaust gases through the catalyst housing during normal operation, but to sealingly engage the valve seat and prevent water from entering the catalyst housing passage and reaching a catalyst therein when engine exhaust pressure drops below a threshold level.

The catalyst housing passage is located in flow communication with combustion chambers of an internal combustion engine, such as a marine engine, and exhaust gases from the combustion chambers are directed through the catalyst to purify the exhaust gases. The valve is biased to a normally closed position, but when exhaust gas pressure in the catalyst housing is sufficiently high, the valve opens and gases flow through the valve for exhaust to the atmosphere through a body of water. The catalyst housing is configured with coolant water passages to deliver coolant water from the engine coolant system to the water jacket surrounding the catalyst housing passage. The water jacket is also in flow communication with the valve housing so that the valve is water cooled as water is mixed with exhaust gases downstream of the catalyst.

In one embodiment, the catalyst housing includes an upper portion, a lower portion, and a gasket therebetween to prevent water from migrating through the joints of the housing and reaching the catalyst. In a further embodiment, the catalyst cooling water jacket includes an exhaust baffle to pressurize water flow into the exhaust stream.

The water jacket cools the catalyst housing and lowers thermal stresses to extend life of the catalyst housing, and the valve protects the catalyst from water contact even during sudden deceleration conditions or reverse operation of the propeller that tends to drive water backward through the exhaust system of an marine engine. The valve is also water cooled, thereby reducing thermal stresses to the valve and extending a working life of the valve. A reliable catalyst exhaust system is therefore provided that is especially advantageous for use in marine engines.

DETAILED DESCRIPTION OF THE INVENTION

While the present invention is described in the context of an outboard motor system, and more particularly in the context of a two stroke outboard motor, the embodiments of the invention set forth herein are intended for illustrative purposes only. It is understood that the present invention is applicable to other types of outboard motors, e.g., a four stroke motor, as well as to other motor applications wherein exposure of exhaust catalyst to water or other impairing substance is of concern, including but not limited to inboard marine engines and stern drive systems. Therefore, the invention is not limited to practice with a particular motor or motor application.

Figure 1:
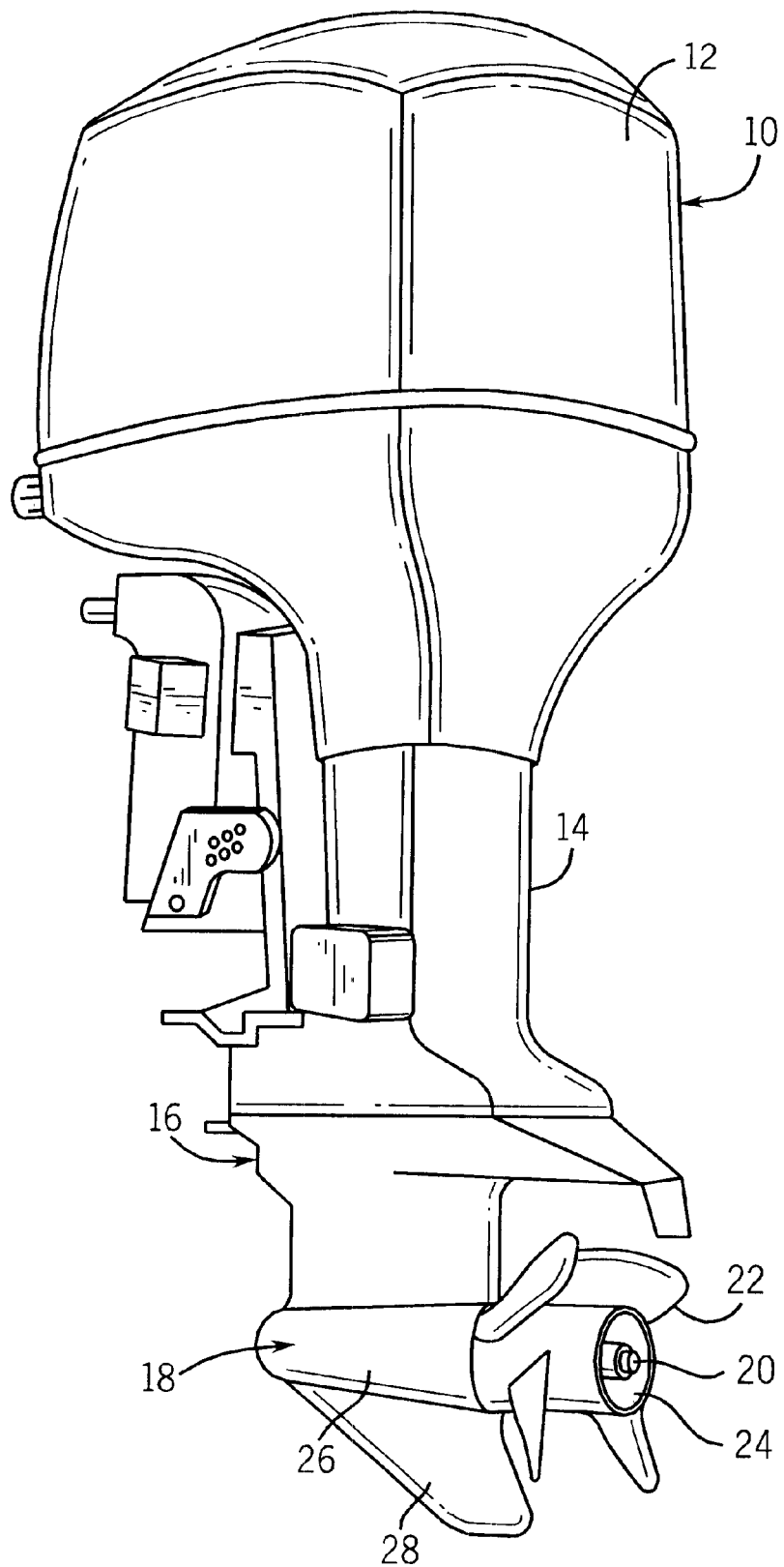
FIG. 1 is a perspective view of an exemplary outboard motor system.

FIG. 1 is a perspective view of an exemplary outboard motor 10, such as an outboard engine commercially available from Outboard Marine Corporation, Waukegan, Ill. Motor 10 includes a cover 12 which houses a power head (not shown), an exhaust housing 14, and a lower unit 16. Lower unit 16 includes a gear case 18 which supports a propeller shaft 20. A propeller 22 is engaged to shaft 20. Propeller 22 includes an outer hub 24 through which exhaust gas is discharged. Gear case 18 includes a bullet, or torpedo, 26 and a skeg 28 which depends vertically downwardly from torpedo 26.

The power head includes an internal combustion engine (not shown in FIG. 1) having a drive shaft (not shown) which engages a gear set in gear case 18 and causes propeller shaft 20 to rotate. As propeller shaft 20 rotates, a thrust is developed to propel a watercraft (not shown) or vessel to which outboard motor 10 is attached.

Figure 2:
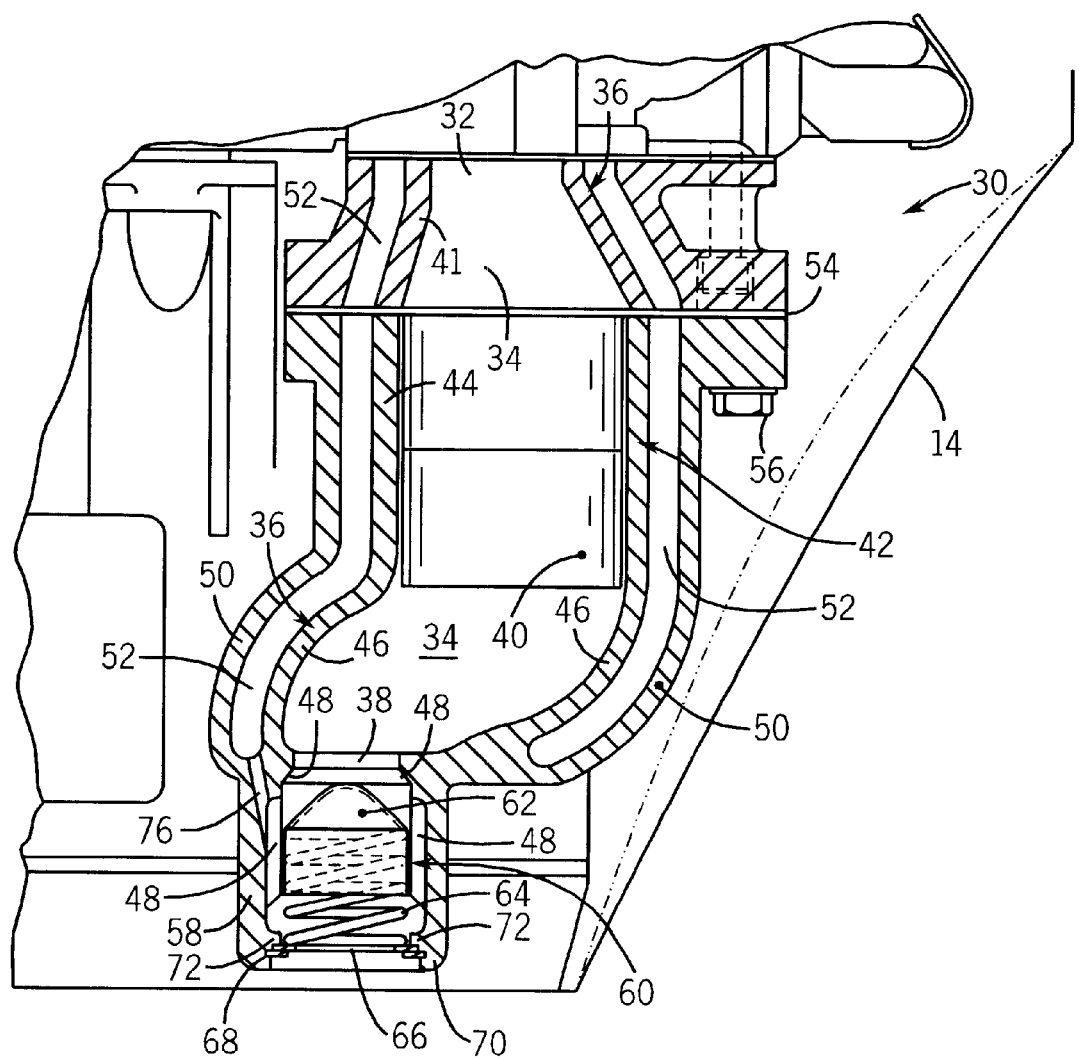
FIG. 2 is a partially broken away view of the outboard motor system shown in FIG. 1 and illustrating a first embodiment of a catalyst exhaust system.

FIG. 2 is a partially broken away view of outboard motor 10 (shown in FIG. 1) through exhaust housing 14 and illustrating a first embodiment of a catalyst exhaust system 30. Catalyst exhaust system 30 includes an inlet end 32 in flow communication with combustion chambers (not shown) of the powerhead through a header pipe (not shown). An exhaust passage 34 extends through a catalyst housing 36 to an outlet end 38, and a known porous catalyst 40 is located in exhaust passage 34 between inlet end 32 and outlet end 38. As exhaust gases pass through catalyst 40, chemical reactions take place therein that remove harmful impurities from combustion exhaust gases before they are vented to the atmosphere through propeller hub 24 (shown in FIG. 1).

In an exemplary embodiment, catalyst housing 36 includes an upper portion 41 and a lower portion 42. Exhaust passage 34 through upper portion 41 is substantially conical in shape and expands in area from inlet end 32 of catalyst housing 36 to where housing upper portion 41 joins housing lower portion 42. Housing lower portion 42 includes a substantially cylindrical portion 44 that contains catalyst 40. A curved portion 46 extends from conical portion 44 to a valve seat 48 at catalyst housing outlet 38. A water jacket 50 surrounds catalyst housing upper portion 41 and catalyst housing lower portion 42 and includes coolant paths 52 for reducing an operating temperature of catalyst exhaust housing 36 when engine coolant is passed therethrough. A flat gasket 54 extends between catalyst housing upper and lower portions 41, 42 to seal connection of housing upper portion 41 and housing lower portion 42, which in one embodiment is accomplished with a conventional bolt (not shown) and nut 56 connection.

A generally cylindrical valve housing 58 extends from housing outlet 38 and contains a valve 60 for sealing engagement with valve seat 48. Valve 60 includes a cone shaped seal member 62 normally biased to a closed position in sealing engagement with valve seat 48 by a biasing member 64, such as a coil spring, that seats on a stainless steel washer 66 which abuts a steel snapring 68 coupled to a lower end 70 of valve housing 58. In one embodiment, seal member 62 is fabricated from stainless steel. In alternative embodiments, seal member 62 is fabricated from other known materials capable of safely withstanding operating temperatures of combustion gases. Lower end 70 of valve housing 58 also includes inwardly projecting baffles 72 that restrict a cross sectional area of valve housing 58 as air and water exit valve housing 58, thereby increasing exhaust pressure exiting catalyst exhaust system 30. Passages 74 are formed into valve housing for flow of exhaust gases around seal member 62 when seal member is disengaged from valve seat 48.

Water jacket 50 includes a water outlet 76 establishing flow communication between coolant path 52 and valve housing 58 to provide a drain for engine coolant when the engine is not in use, and further to provide a coolant path for valve 60 in operation.

In one embodiment, water jacket 50, catalyst housing 36, and valve housing 58 are integrally formed and fabricated from stainless steel through known fabrication methods, such as a casting operation. In alternative embodiments, other known materials capable of safely withstanding operating temperatures of catalyst exhaust system 30 are used to fabricate catalyst housing 36, water jacket 50, and valve housing 58, together or separately. In still another embodiment, one or more of catalyst housing 36, water jacket 50, and valve housing 58 are fabricated from different materials. Still further, one or more of catalyst housing 36, water jacket 50, and valve housing 58 may be integrated into exhaust housing 14 (shown in FIG. 1) in another embodiment.

When water jacket coolant paths 52 are coupled to engine coolant paths (not shown), catalyst exhaust system 30 operates as follows. Exhaust gases from engine combustion chambers are routed to inlet end 32 of catalyst housing upper portion 41 through a header pipe (not shown) and into exhaust passage 34. Exhaust gases expand as they pass through exhaust passage 34 of housing upper portion 41 and into catalyst 41 where the gases are purified by chemical reaction. After flowing through catalyst 40, gases are directed by lower housing curved portion 46 toward outlet end 38. When exhaust gas pressure at housing outlet end 38 is sufficient to overcome a biasing force of valve biasing member 64, seal member 62 is displaced downwardly from housing outlet end valve seat 48 and exhaust gases flow through housing outlet end 38 and into valve housing 58 around seal member 62 and though an opening (not shown) in steel washer 66 to exit catalyst exhaust system 30. After flowing through catalyst exhaust system 30, exhaust gases are directed through exhaust passages (not shown) in gear case 18 (shown in FIG. 1) and ultimately through propeller hub 24 (shown in FIG. 1) and into a body of water.

The engine coolant system (not shown) includes a water pump (not shown) that delivers cooling water to the powerhead from a cooling water inlet (not shown) in lower unit 16 (shown in FIG. 1). Because water jacket coolant paths 52 are coupled to the engine coolant system, coolant water is also distributed to water jacket coolant paths 52, thereby cooling catalyst housing upper and lower portions 41, 42 and reducing elevated temperatures of catalyst housing 36 due to chemical reaction with hot exhaust gases. Exhaust gas pressure also draws coolant water through water jacket coolant paths 52, and water jacket water outlet 76 allows coolant water to flow into valve housing 58 and over seal member 62 as coolant water mixes with exhaust gases in valve housing 58.

Figure 3:
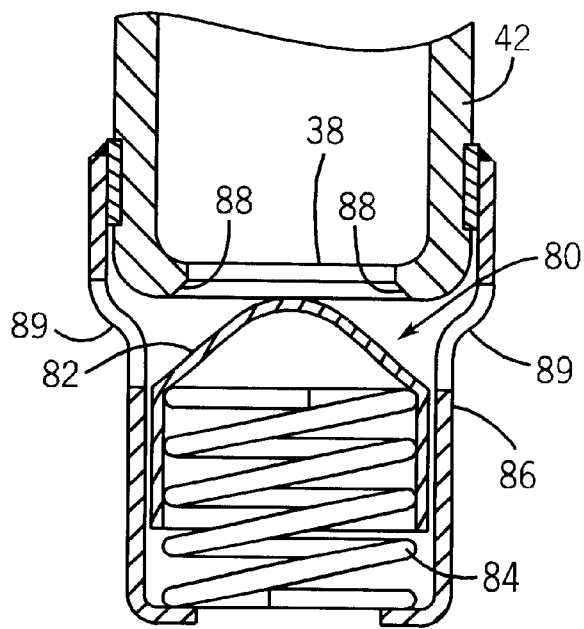
FIG. 3 illustrates a first alternative embodiment of a valve for the catalyst exhaust system shown in FIG. 2.

FIG. 3 illustrates a first alternative embodiment of a valve 80 for catalyst exhaust system 30 (shown in FIG. 2) and including a rounded cup-shaped seal member 82 and a coil spring biasing member 84 within a valve housing 86 coupled to catalyst housing lower portion 42. Rounded seal member 82 engages a valve seat 88 in catalyst housing outlet end 38 to prevent water from entering catalyst housing lower portion 42. Valve housing 86 includes slots 89 for passage of exhaust gases through valve housing 86 and into an exhaust path (not shown) in flow communication with catalyst exhaust system 30 (shown in FIG. 2) when seal member 82 is disengaged from valve seat 88.

Figure 4:
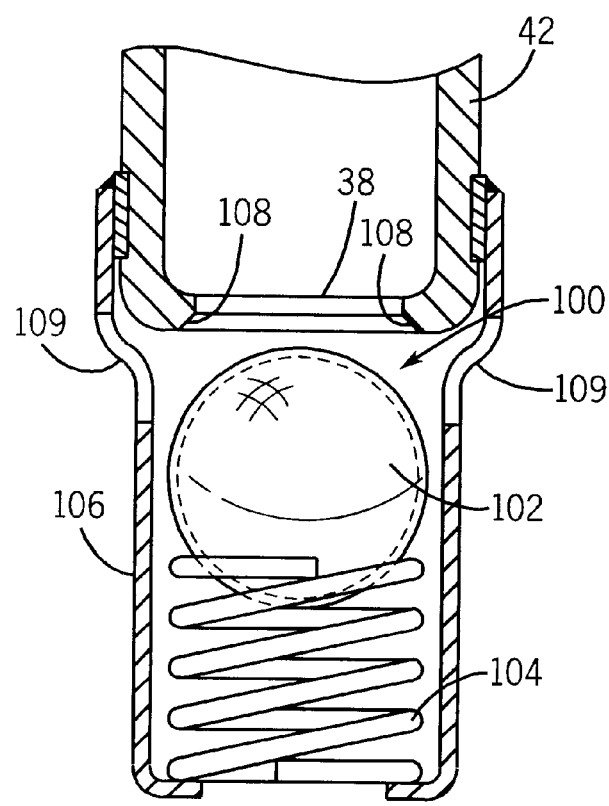
FIG. 4 illustrates a second alternative embodiment of a valve for the catalyst exhaust system shown in FIG. 2.

FIG. 4 illustrates a second alternative embodiment of a valve 100 for catalyst exhaust system 30 (shown in FIG. 2) and including a spherical ball seal member 102 resting upon a coil spring biasing member 104 within a valve housing 106 coupled to catalyst housing lower portion 42. Ball seal member 102 engages a valve seat 108 in catalyst housing outlet end 38 to prevent water from entering catalyst housing lower portion 42. Valve housing 106 includes slots 109 for passage of exhaust gases through valve housing 106 and into an exhaust path (not shown) in flow communication with catalyst exhaust system 30 (shown in FIG. 2) when seal member 102 is disengaged from valve seat 108.

Figure 5:
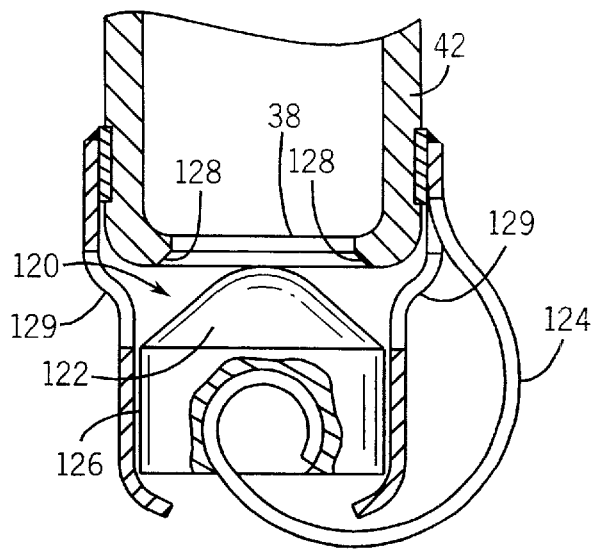
FIG. 5 illustrates a third alternative embodiment of a valve for the catalyst exhaust system shown in FIG. 2.

FIG. 5 illustrates a third alternative embodiment of a valve 120 for catalyst exhaust system 30 (shown in FIG. 2) and including a frustaconical seal member 122 biased to a normally closed position by a leaf spring biasing member 124 within a valve housing 126 coupled to catalyst housing lower portion 42. Frustaconical seal member 122 engages a valve seat 128 in catalyst housing outlet end 38 to prevent water from entering catalyst housing lower portion 42. Valve housing 126 includes slots 129 for passage of exhaust gases through valve housing 126 and into an exhaust path (not shown) in flow communication with catalyst exhaust system 30 (shown in FIG. 2) when seal member 122 is disengaged from valve seat 128.

In further alternative embodiments, still other types of seal members and biasing members are used to sealingly close and open catalyst housing lower end. Consequently, the invention is not intended to be limited to practice with any of the foregoing types of valves.

Figure 6:
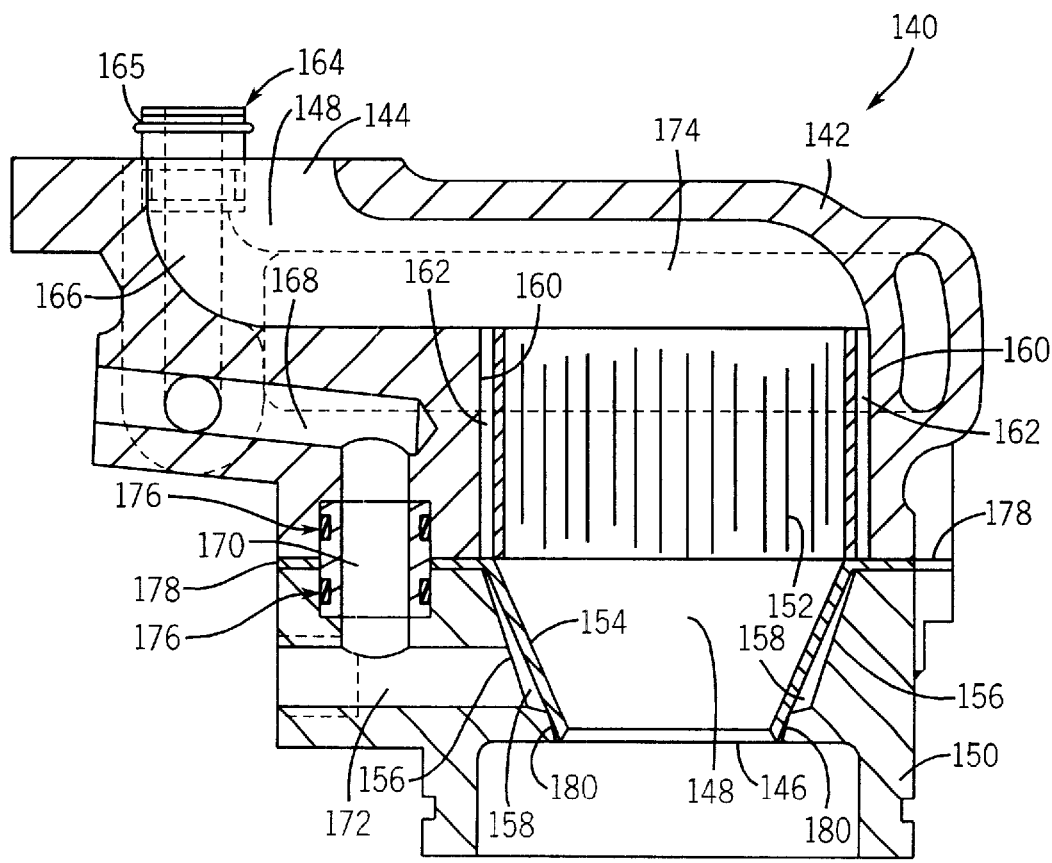
FIG. 6 is cross sectional view of a second embodiment of a catalyst exhaust system.

FIG. 6 is cross sectional view of a second embodiment of a catalyst exhaust system 140 including a catalyst exhaust upper housing portion 142 including an inlet end 144 and an outlet end 146 in flow communication with one another through an exhaust passage 148 extending through catalyst housing upper portion 142 and a catalyst housing lower portion 150. A known catalyst 152 is located in exhaust passage 148 between inlet end 144 and outlet end 146, and a funnel shaped vane 154 extends downstream of catalyst 152 and is separated from outer walls 156 of exhaust passage 148 to create water jacket coolant paths 158 in catalyst housing lower portion 150. Catalyst 152 is also separated from outer walls 160 of exhaust passage 148 through catalyst housing upper portion 142, thereby creating water jacket coolant paths 162 about catalyst 152.

In one embodiment, vane 154 is separately fabricated from catalyst housing lower portion 150 and from a known material suitable for high temperature exposure to exhaust gases. In an alternative embodiment, vane 154 is integral to catalyst housing lower portion 150.

A cylindrical transfer tube 164 includes an o-ring gasket 165 for connection to the engine coolant system and is in fluid communication with coolant passages 166, 168, 170 and 172 (some of which are shown in phantom) in flow communication with upper and lower water jacket cooling paths 162, 158, respectively. O-ring gasket connections 176 form a sealed connection of catalyst housing upper and lower portions 142, 150 though coolant passage 170, and a flat gasket 178 extends between catalyst housing upper and lower portions 142, 150. Lower portion 150 includes restricting exhaust baffles 180 to pressurize coolant water flow into a valve housing (not shown in FIG. 6) in flow communication with catalyst housing outlet end 146. A valve (not shown in FIG. 6) is contained in the valve housing and operates as described above in relation to catalyst exhaust system 30 (shown in FIG. 2).

In one embodiment, transfer tube 164 is fabricated from a stainless steel material and is integral with upper housing portion 142. In an alternative embodiment, transfer tube 164 is a separately formed piece that is sealingly coupled to coolant passages 166 and 174. Through use of an appropriately shaped transfer tube 164, catalyst exhaust system 140 is adaptable to a variety of engine types.

Figure 7:
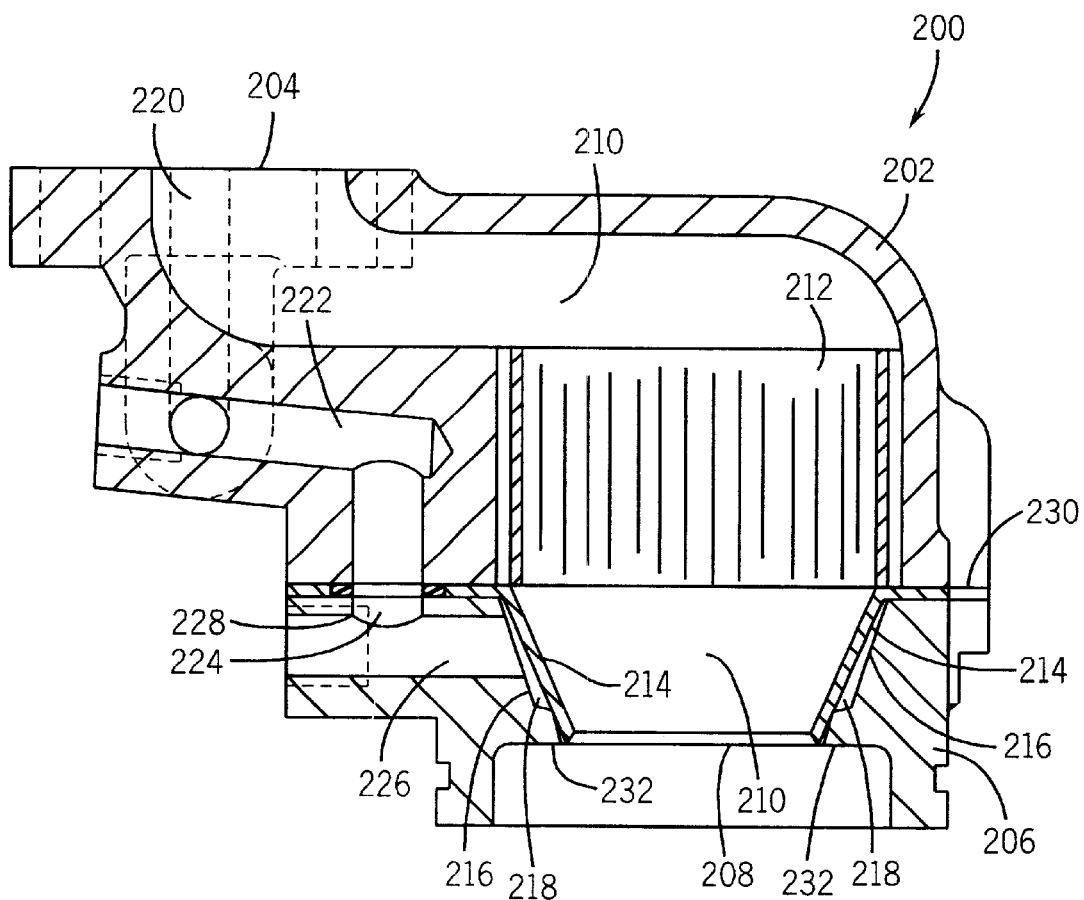
FIG. 7 is a cross sectional view of a third embodiment of a catalyst exhaust system.

FIG. 7 is a cross sectional view of a third embodiment of a catalyst exhaust system 200 including a catalyst exhaust system upper housing 202 including an inlet end 204 and a catalyst housing lower portion 206 having an outlet end 208 in flow communication with one another through an exhaust passage 210 extending through catalyst housing upper portion 202 and lower portion 206. A known catalyst 212 is located in exhaust passage 210 between inlet end 204 and outlet end 208, and a funnel shaped vane 214 extends downstream of catalyst 212 and is separated from outer walls 216 of exhaust passage 210 to create water jacket coolant paths 218 in catalyst housing lower portion 206.

Coolant passages 220, 222, 224 and 226 (some of which are shown in phantom) are in flow communication with water jacket cooling paths 218 and distribute engine coolant about vane 214 when fluid passages 220, 222, 224, and 226 are coupled to an engine coolant system (not shown in FIG. 7). O-ring gasket connections 228 form a sealed connection of catalyst housing upper and lower portions 202, 206 though coolant passage 224, and a flat gasket 230 extends between catalyst housing upper and lower portions 202, 206. Housing lower portion 206 includes restricting exhaust baffles 232 to pressurize coolant water flow into a valve housing (not shown in FIG. 7) in flow communication with catalyst housing outlet end 208. A valve (not shown in FIG. 7) is contained in the valve housing and operates as described above.

While the invention has been described in terms of various specific embodiments, those skilled in the art will recognize that the invention can be practiced with modification within the spirit and scope of the claims.

What is claimed is:

1. A marine engine comprising:
   at least one combustion chamber;
   a catalyst exhaust housing in flow communication with said at least one combustion chamber, said catalyst exhaust housing comprising a passage therethrough;
   a water jacket surrounding said exhaust housing passage; and
   a valve in flow communication with said exhaust housing passage and configured to prevent water from entering said exhaust housing passage, said water jacket configured to direct water to impinge upon said valve to cool said valve.

2. A marine engine in accordance with claim 1 wherein said catalyst exhaust housing and said water jacket are integral.

3. A marine engine in accordance with claim 1 wherein said catalyst exhaust housing comprises an outlet end and a valve seat, said valve engaging said valve seat to prevent water from entering said passage.

4. A marine engine in accordance with claim 3 wherein said valve comprises a biasing member and a seal member.

5. A marine engine in accordance with claim 3 wherein said outlet end comprises an exhaust baffle.

6. A marine engine in accordance with claim 1 further comprising a catalyst in said passage.

7. A marine engine in accordance with claim 1 wherein said marine engine includes a cooling system, said catalyst exhaust housing configured to direct water from said cooling system to said water jacket.

8. A marine engine in accordance with claim 7 wherein said catalyst exhaust housing comprises an upper portion and a lower portion, said water jacket comprising an upper portion and a lower portion, said catalyst exhaust housing configured to direct water to at least one of said water jacket upper portion and said water jacket lower portion.

9. A marine engine in accordance with claim 8 further comprising a gasket between said catalyst exhaust housing upper portion and said lower portion.

10. A catalyst exhaust system comprising:
    a catalyst housing comprising an inlet and, an outlet end, and a passage therethrough;
    a water jacket surrounding said catalyst housing; and
    a valve in flow communication with said catalyst housing outlet end and in flow communication with said water jacket, said valve configured to permit draining of engine coolant from said water jacket when said valve is closed.

11. A catalyst exhaust system in accordance with claim 10 wherein said valve is configured to prevent water from entering said passage.

12. A catalyst exhaust system in accordance with claim 11 wherein said valve comprises a cup-shaped seal member.

13. A catalyst exhaust system in accordance with claim 10 wherein said water jacket is integral with said catalyst housing.

14. A catalyst exhaust system in accordance with claim 10 further comprising a catalyst in said passage.

15. A catalyst exhaust system in accordance with claim 10 wherein said catalyst housing comprises an upper portion and a lower portion, said catalyst exhaust system further comprising a gasket between said upper and lower portion.

16. A catalyst exhaust system in accordance with claim 15 wherein said gasket is a flat gasket.

17. A catalyst in accordance with claim 10 wherein said water jacket comprises an exhaust baffle.

18. A catalyst exhaust system comprising:
   a catalyst housing comprising an inlet end, an outlet end, and a passage therethrough, said outlet end comprising a valve seat;
   a water jacket surrounding said catalyst housing; and
   a valve housing having a pressure actuated valve therein, the pressure actuated valve in fluid communication with said valve seat, wherein said valve housing further comprising slots for passage of exhaust when said valve is open.

19. A catalyst exhaust system in accordance with claim 18 further comprising a valve housing, said valve housing in flow communication with said outlet end and in flow communication with said water jacket.

20. A catalyst exhaust system in accordance with claim 19 wherein said valve comprises a cup-shaped seal member.

21. A catalyst exhaust system in accordance with claim 18 wherein said water jacket is integral with said housing.

22. A catalyst exhaust system in accordance with claim 18 further comprising a catalyst in said passage.

23. A catalyst exhaust system in accordance with claim 18 wherein said housing comprises an upper portion and a lower portion, said catalyst exhaust system further comprising a gasket between said upper and lower portion.

24. A catalyst exhaust system in accordance with claim 23 wherein said gasket is a flat gasket.

25. A catalyst exhaust system in accordance with claim 24 wherein said gasket comprises an o-ring.

26. A catalyst in accordance with claim 18 wherein said water jacket comprises an exhaust baffle.

* * * * *